W. H. Bryan.
Scow
N° 8,266.
Patented Jul. 29, 1851.
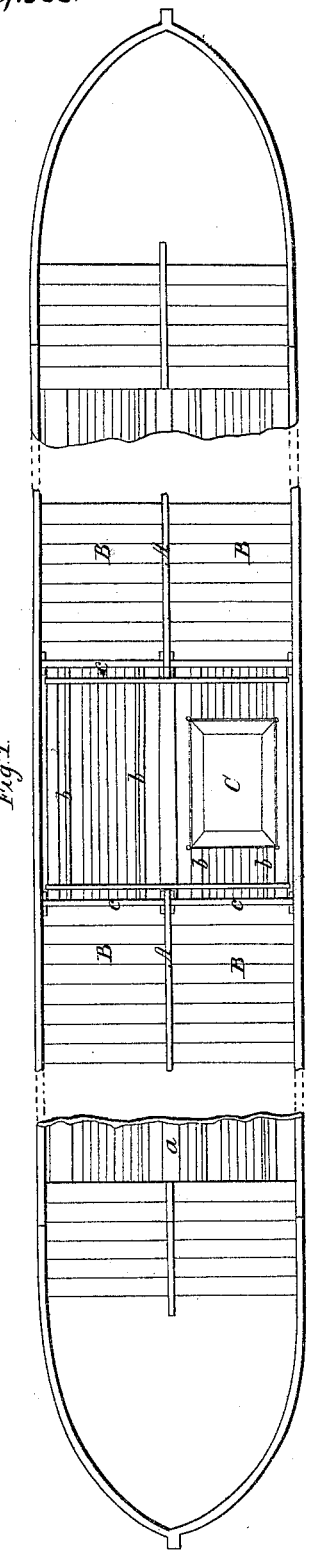
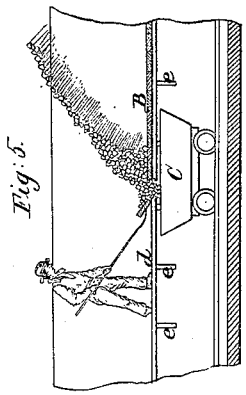
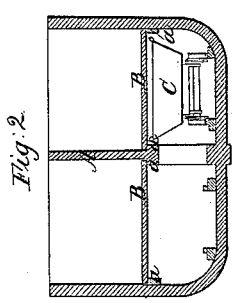
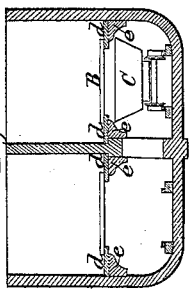
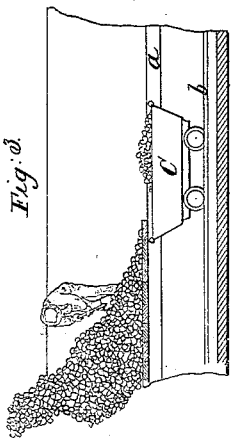

UNITED STATES PATENT OFFICE.

WM. H. BRYAN, OF GEORGETOWN, DISTRICT OF COLUMBIA.

FITTING FOR BOATS TO FACILITATE THE DISCHARGE OF CARGOES.

Specification of Letters Patent No. 8,266, dated July 29, 1851.

*To all whom it may concern:*

Be it known that I, WILLIAM H. BRYAN, of Georgetown, in the District of Columbia, have invented certain new and useful improvements in the construction of canal-boats and other vessels to facilitate the discharge therefrom of freight and particularly coal; and I do hereby declare that the following is a full, clear, and exact description of my said invention, reference being had to the accompanying drawing, which form part of this specification and in which—

Figure 1 represents a plan of a canal boat constructed upon the principles of my invention, and Figs. 2, 3, 4, and 5, are various sections showing the arrangement and construction of the vessel.

My invention consists in fitting up vessels with a removable sectional floor or cargo deck to receive lading in bulk; which floor is placed at such a distance from the bottom of the vessel as will admit a car between the two to receive the cargo from above and to convey it to the hatchway or other point of delivery, thus facilitating the removal of the cargo and lessening the cost thereof, while at the same time if a cargo in packages is to be transported, the sections of the floor being single narrow planks can be readily removed to admit of the stowage of the packages in the usual manner upon the bottom of the vessel. By this means a vessel may be fitted up at small expense to facilitate the unlading of cargo in bulk without rendering her less convenient for carrying cargo in packages, for the sectional deck can be readily taken out or put in place as the nature of the cargo may require.

The canal boat represented in the accompanying drawings at Figs. 1, 2, and 3, is divided longitudinally into two compartments of equal width by a partition A. The bottom B of each of these compartments is composed of loose plank laid upon longitudinal timbers $a\ a$ secured at the sides and center of the vessel. The space beneath each of these compartments is sufficient to admit a car C whose wheels run upon rails $b$ which are laid upon the floor of the vessel. Each of the longitudinal compartments is divided by bulkheads $c\ c$ which are situated at such a distance from each other as will permit the car to be lowered into or drawn out of the vessel between them. When vessels are fitted up in the manner above described the cargo, coal for example, is shipped in bulk into the compartments, and is supported by the sectional floor. When the cargo is to be unloaded, that portion of it resting against the central bulkheads is first removed by removing the bulk-heads and allowing it to fall into the car, which is rolled into a situation to receive it, and when filled is hoisted from the vessel; the remainder of the cargo is removed as shown at Fig. 3 by shoving it into the cars. The loose floor planks are removed one at a time as soon as possible, and the car is run up on the rails into the most advantageous position to receive its load. By this method of constructing the vessel the labor of throwing out the cargo is dispensed with, and the process of shoveling is confined almost wholly to the directing of the coal as it rolls down by its own gravity into the car.

In the arrangement of the vessel shown at Figs. 4 and 5, the sectional floor B on which the cargo lays differs in its construction from that above described; in this example the loose planks do not extend entirely across the bottom of the compartment but rest at their extremities upon ledges $d\ d$ which are supported by knees $e$; these ledges are of such width that they project over the sides of the car beneath, as shown in section at Fig. 4. When the cargo is to be discharged from a vessel constructed in this manner the loose planks are successively removed by means of a hook, as shown at Fig. 5, or in any other convenient manner, and the cargo drops directly into the car beneath. The small portion which lodges on the side ledges may be shoved into the car by means of a broom or shovel. The loaded cars may be raised from the vessel by means of a crane or some other suitable device and swung upon an elevated track on which they can be run along to the place where the load is to be discharged. In order to facilitate the running of the cars the elevated railway should if possible be made to descend slightly as it recedes from the vessel. By this method of fitting up vessels the labor of unloading the cargo is very much diminished, but this is not the only advantage when coal is the cargo for it has been found that the shoveling of bituminous coal breaks it up and thus injures its quality to a much greater extent than allowing it to run into a car, hence coal when unloaded in this manner will bear a higher price in the market. From the great fragility of bituminous coal it is broken and thereby deteriorated in marketable value every time it is moved, and the amount of this deterioration is proportioned to the violence of the movement; it therefore follows that the less the distance the coal is dropped, or the nearer the floor on which it lays can be brought to the cars, the less the coal will be broken. The arrangement I have described admits of the floor being placed as near to the cars as is possible without actually touching them, and does not require the space which is necessary when the floor is formed of trap-doors which swing downward to allow the material upon them to escape. This arrangement is also more compact than any hitherto essayed, as the removable floor can be set at a less distance from the bottom of the vessel, and as the height of canal boats is limited by the head way under the bridges, this lowering of the removable floor is a matter of importance. This method of constructing the removable floor is also stronger than any system of trap doors, for in the latter the hinges and fastenings have to sustain the whole weight, while in my method the ends of the floor plank are supported solidly by the side ledges. By this improvement, also, a cargo of coal can be unloaded in much less time than when unloaded in the ordinary manner, hence a much less area of dock room than is generally necessary will be sufficient to enable a specified number of boats to unload in a given space of time. This system is peculiarly applicable to those vessels from which coal is transferred to sea steamers as the coaling can be completed in a much shorter time in this manner than when effected in the usual way.

The two plans I have represented and described are sufficient to elucidate my invention and to show how it may be carried into effect, but various modifications may be made in the arrangement and fitting up of vessels without departing from the principles of my invention; thus, for example, the central bulk-heads may be omitted and an opening made through the short decks at the bow and stern of a canal boat to admit the cars. The ordinary floor plank may also be omitted, and the tracks may be laid directly upon the timbers of the vessel. Vessels may also be constructed with several tracks upon their floors or with but one according to their size and the views of the constructor.

I am aware that vessels have heretofore been constructed with permanent cargo decks placed at a distance from the bottom of the vessel and provided with hatchways through which cargo in bulk could be dropped into cars arranged to run upon railways secured to the bottom of the vessel; but such decks are expensive in the first instance, are not so well adapted to the unlading of cargo in bulk and are not susceptible of removal and replacement to fit the vessel alternately for carrying cargo in packages and cargo in bulk. These or other objections have proved to be so serious that this mode of fitting up vessels has not been adopted to any extent; and I make no claim to it, my invention being limited to a deck of narrow sections and wholly removable, therefore

What I claim as my invention and desire to secure by Letters Patent is—

The cargo deck formed of loose narrow sections so that it may be removed to adapt the vessel to carrying cargo in packages or may be put in place to facilitate the unlading of cargo in bulk, in combination with the railway on the floor for transporting the lading to the point whence it is removed from the hold.

In testimony whereof I have hereunto subscribed my name.

WM. H. BRYAN.

Witnesses:
 CLEM S. STULL,
 E. S. RENWICK.